United States Patent [19]

Fahey

[11] Patent Number: 4,753,665
[45] Date of Patent: Jun. 28, 1988

[54] METHOD AND APPARATUS FOR CONTROLLING THE SUCTION PRESSURE IN A DUST COLLECTING DUCT

[76] Inventor: James Fahey, 99 New North Road, Edgerton, Huddersfield, West Yorkshire, England, HD1 5QL

[21] Appl. No.: 900,084

[22] Filed: Aug. 25, 1986

[30] Foreign Application Priority Data

Aug. 23, 1985 [JP] Japan ................................ 60-186177

[51] Int. Cl.⁴ .............................................. B01D 46/10
[52] U.S. Cl. ........................................ 55/218; 55/270; 55/419; 55/432; 55/471
[58] Field of Search ........................ 55/21, 96, 97, 218, 55/270, 310, 417–419, 428, 432, 471; 19/107

[56] References Cited

U.S. PATENT DOCUMENTS

| | | | |
|---|---|---|---|
| 1,048,477 | 12/1912 | Allington | 55/419 X |
| 1,597,051 | 8/1926 | Brown | 55/418 X |
| 2,100,112 | 11/1937 | Taylor | 55/432 X |
| 2,119,478 | 5/1938 | Whiton, Jr. | 55/210 |
| 2,431,726 | 12/1947 | Bechtler | 57/34 |
| 3,006,173 | 10/1961 | Shoaf | 55/428 X |
| 3,053,700 | 9/1962 | Kulp | 55/428 X |
| 3,059,896 | 10/1962 | Reiterer | 19/107 X |
| 3,150,415 | 9/1964 | Reiterer | 19/107 |
| 3,188,783 | 6/1965 | Savage | 55/21 X |
| 3,486,309 | 12/1969 | Wild | 55/432 X |
| 3,612,616 | 10/1971 | Stewart et al. | 19/107 X |
| 3,627,584 | 12/1971 | Stewart | 134/21 |
| 3,655,361 | 4/1972 | Brown et al. | 55/210 X |
| 3,987,517 | 10/1976 | Bonalumi | 19/107 |
| 3,993,460 | 11/1976 | Gooch et al. | 55/270 X |
| 4,285,617 | 8/1981 | Gozion et al. | 55/428 X |
| 4,447,249 | 5/1984 | Kopena | 37/3 |
| 4,521,226 | 6/1985 | Alig et al. | 55/21 |

FOREIGN PATENT DOCUMENTS

| | | | |
|---|---|---|---|
| 2032476 | 1/1972 | Fed. Rep. of Germany . | |
| 2336758 | 9/1972 | Fed. Rep. of Germany . | |
| 3141376 | 10/1981 | Fed. Rep. of Germany . | |
| 3121521 | 1/1983 | Fed. Rep. of Germany | 19/107 |
| 913993 | 6/1954 | Switzerland . | |
| 2081758 | 2/1982 | United Kingdom | 19/107 |
| 2082351 | 3/1982 | United Kingdom . | |

Primary Examiner—Robert Spitzer
Attorney, Agent, or Firm—W. Thad Adams, III

[57] ABSTRACT

The invention is concerned with pneumatic apparatus for removing fibres, dust and threads from industrial processes, particularly in the textile industry. In an arrangement in which there is a plurality of collecting heads each associated with a part of a machine from which dust, fibres or threads are likely to be emitted, each of these collectors leads into a common duct which in turn leads to a suction fan and filter.

The suction pressure (or any other physical characteristic of the air in the duct which relates to the suction pressure) is detected, and a signal from this detector is compared with a signal corresponding to a desired suction pressure and the output signal from the comparator used to control the speed of the driving motor for the suction fan. In this way, the suction pressure in the duct approximates to a constant pressure, despite variations due to the build-up of material on the filter or other factors such as the opening and closing of dampers controlling the flow of waste material into the duct. Consequently, the fan speed can be set at an optimum value, instead of having to set it at a value which will ensure operation of the system under the worst conditions. Hence, a large energy saving is possible.

8 Claims, 3 Drawing Sheets

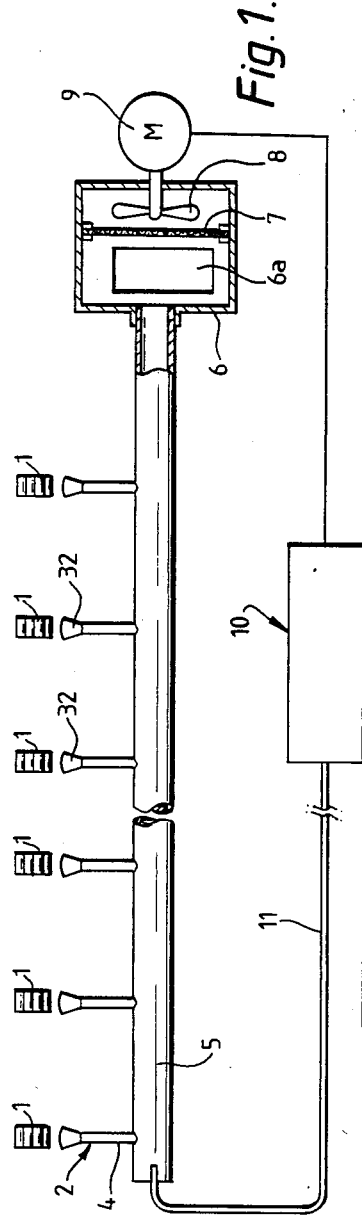
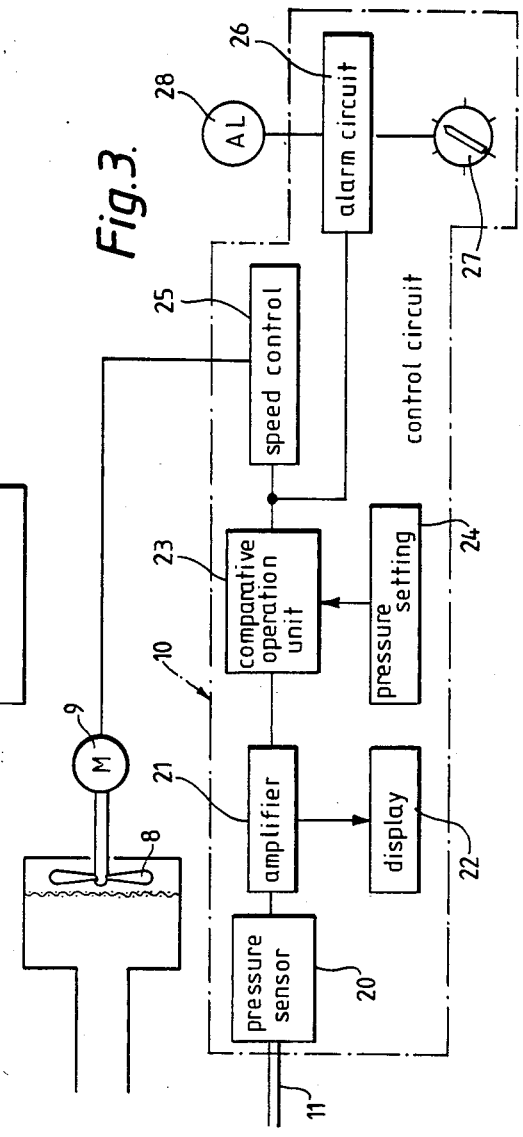

METHOD AND APPARATUS FOR CONTROLLING THE SUCTION PRESSURE IN A DUST COLLECTING DUCT

The invention relates to a method and apparatus for the pneumatic removal of fibres, dust and threads from industrial processes, particularly in the textile industry. There are various processes in a textile mill where dust or fibrous material is released into the atmosphere, and it is desirable, and in many cases mandatory, that the dust or fibres are collected at the release position before they can contaminate the general atmosphere in the mill. In some instances also, pieces of thread are released and have to be collected.

A typical instance where the present invention finds an application is in a ring spinning machine, where at each spinning station, dust is released into the atmosphere. Moreover, when a thread breaks, although the trailing end in advance of the break is wrapped on to the yarn package, the thread continues to issue from the drafting mechanism, and this thread has to be collected. It is known to provide a pneumatic system for clearing thread, fibres and dust from the drafting heads of ring spinning machines. At each drafting head, there is a suction device, all these devices being connected into a duct extending along the length of the machine. The duct leads to a suction box in which there is a motor driven fan creating the suction in the duct and suction devices, and a filter through which the airstream from the duct passes. Any dust, fibres or thread entrained in the airstream collects on the filter, which has to be cleaned or changed from time to time.

The ring spinning machine is only one instance of a textile machine to which pneumatic fibre and dust removal equipment is fitted. Another well known instance is a carding machine, where there are suction nozzles disposed at various locations where dust is likely to be released (e.g. under the taker-in; adjacent to the rollers and strippers or at the front end of the flats) all these nozzles being connected to a common duct leading to a suction fan and filter arrangement. There are other textile processes such as the blow room, combing and twisting, where pneumatic fibre and dust collecting system can be used, and the present invention is applicable to these also. Moreover, the invention is not confined to yarn preparation processes; it can for instance be used in a fabric sewing room where a thread collecting device is provided beneath the sewing head of each sewing machine and a plurality of collecting devices are connected into a common duct.

In the conventional pneumatic waste dust, fibre or thread collecting device, hopper-shaped dust collecting heads are provided near the processing machines disposed at proper intervals in multiple rows; branch ducts connected to the heads are linked to a main duct; dampers are provided in the branch ducts, and a dust collecting filter and dust collecting fan are provided in a dust box provided at the terminal end of the main duct, there being a driving motor connected to the dust collecting fan and driven through a simple control circuit.

The control circuit itself comprises an adjusting circuit for fine manual adjustment of the speed of the driving motor, because it is necessary to set the suction pressure in the duct at a value appropriate to the particular application, since the duct length and diameter vary. Alternatively, a circuit may be provided which is designed to vary the motor speed in steps depending on an external command signal manually applied to the control circuit.

In this kind of pneumatic dust, fibre and thread collecting system, it is known to employ an AC motor to drive the suction fan, and the motor speed may be constant or variable, and if it is variable, the speed may be fine adjusted or changed in steps by means of a control circuit as mentioned above. However, in order to ensure that the system functions properly despite changes in the load, due to variation of the air resistance, which is itself due to opening or closing of dampers in the system or accumulation of dust, fibres and/or threads on the dust collecting filter, the suction pressure has to be set at an unnecessarily high level. As a consequence, the power consumption of the driving motor is also at an unnecessarily high level and in a textile spinning mill for example, operating continuously for long periods, it is highly desirable to reduce the power consumption of the driving motor, whilst maintaining effective operation of the dust collecting system.

According to a first aspect of this invention a method of controlling the operation of a pneumatic dust, fibre or yarn collecting system of the kind in which there is a plurality of suction heads leading into a duct and a motor driven suction device arranged to suck air through the suction heads and the duct, there being a filter located in the path of the airstream so that solid material entrained in an airstream flowing in the duct and through the filter is collected on the filter, is characterised in that a physical characteristic of the air in the duct is detected and the speed of the driving motor is controlled in response to the detected physical characteristic in a manner to maintain the suction pressure in the duct as near constant as possible.

Preferably, the air pressure in the duct is detected, although it would be possible to detect some other physical characteristic of the air in the duct having a relationship to the suction pressure. For instance, the air velocity or the volumetric displacement of the air could be sensed by an appropriate form of detector.

It is further preferred that an electrical signal is generated proportional to the detected physical characteristic; this generated electrical signal being compared with a predetermined value electrical signal corresponding to the physical characteristic which would exist in the duct given the desired constant suction pressure and if the generated signal varies from the reference signal, a speed control signal is issued to the driving motor to vary the speed of the motor to bring about restoration of the constant suction pressure in the duct. Further, it is preferred that the motor is stopped in response to a detected physical characteristic of the air in the duct corresponding to a predetermined overload condition.

According to a second aspect of the invention, apparatus for controlling the operation of a pneumatic dust, fibre or yarn collecting system of the kind in which there is a plurality of suction heads leading into a duct and a motor driven suction device arranged to suck air through the suction heads and the duct, there being a filter located in the path of the airstream so that solid material entrained in an airstream flowing in the duct and through the filter is collected on the filter, is characterised in that there are provided a sensor for detecting a physical characteristic of the air in the duct; a comparator for comparing an output signal proportional to the detected physical characteristic with a reference signal proportional to the physical characteristic which would exist in the duct given the desired suction pressure in the duct, and control means responsive to an output signal from the comparator for varying the speed of the driving motor.

Preferably, the sensor is adapted to detect the air pressure in the duct, although it could be adapted to detect some other physical characteristic of the air in the duct, such as the velocity or volumetric displacement of the air.

It is further preferred, that a pressure setting means is provided for generating a reference voltage proportional to the desired suction pressure in the duct. Moreover, the sensor is preferably a diffusion type semi-conductor pressure sensor, and it is preferred that it has an accuracy within the range of ±2%.

It is preferred that the control means is a pulse width modulation type revolution controller.

It is further preferred that means are provided for stopping the motor on detection of a physical characteristic of the air in the duct corresponding to a predetermined overload condition.

When dust, fibrous material or thread is collected in a collecting head above a predetermined quantity, the damper of that collecting head is opened, and the material is discharged through the branch duct into the main duct by the suction pressure, and is projected against the filter at a relatively high velocity. In order to prevent restriction of the flow due to attachment of the waste material to some part of the branch duct or main duct, due to its specific gravity or friction, the suction pressure in the main duct must be greater than the minimum requirement. When the volume of the material collected by the filter increases with the passing of time, the stage is arrived at where the driving motor is overloaded. At this stage, the alarm circuit is operated to alert the operatives to the need to clean the filter and the motor is stopped. After removing the waste material from the fan box, the operation of the system can be resumed. In one construction, each suction head comprises a collecting device and a damper controlling the outlet from the collecting device, there being means for detecting the presence of a threshold quantity of material in the collecting device and control means for opening the damper to release material from the collecting device into the duct on the attainment of the threshold quantity. Preferably the means for detecting the presence of a threshold quantity of material comprises a light source and a photoelectric detector arranged so that a beam of light from the light source on to the photoelectric detector is interrupted by the material in the collecting device when the material attains the threshold quantity.

A plurality of dust collecting heads is provided for the main duct, and the dampers corresponding to them are opened and closed in accordance with the state of accumulation of waste material in each dust collecting head. Therefore, when a damper is opened, the suction pressure in the duct drops instantaneously. As a result, this suction pressure drop is detected by the sensor, and the speed of the driving motor is raised through the control circuit in order to raise the suction pressure by the amount required to restore the pressure drop. On the other hand, when an open damper is closed, the resistance due to the collecting head increases, and the suction pressure in the duct rises. If the speed of the driving motor remains high, the power consumption of the driving motor increases due to elevation of the suction pressure. Therefore, in a similar manner, this suction pressure change is detected by the sensor, and a command is issued to the control circuit to lower the speed of the driving motor to restore the desired suction pressure. In this way whilst the dampers may be opened and closed repeatedly, the material conveyed by high speed air flow accumulates on the filter and as the deposit increases, the air resistance becomes larger. As a result, if the suction pressure of the dust collecting fan remains constant, the effective suction pressure on the upstream side of the filter becomes smaller than desired. Since the sensor cannot distinguish such change in the suction pressure from the change in suction pressure due to opening and closing of the dampers, by detecting the result of pressure change, the speed of the driving motor is continuously varied so that the suction pressure in the main duct always approximates to the minimum required set value, so as to follow up the fluctuations of the suction pressure at high speed.

Whilst reference has been made to a pneumatic system, in which there is a plurality of suction heads each of which incorporates a damper, it is to be understood, that the invention can be used in situations, where the suction heads (or nozzles) are always open into the main duct, i.e. there is no separate damper control. In that case, the control system provided by the present invention is only required to cope with variations in the suction pressure due to the accumulation of material on the filter, but it is still possible to utilise the invention to effect considerable savings in the energy requirement of the fan driving motor.

Two embodiments each in accordance with the invention will now be described by way of examples only, with reference to the accompanying drawings, in which:

FIG. 1 is a diagrammatic arrangement of a waste yarn collecting apparatus applied to a ring spinning machine;

FIG. 3 is a block schematic diagram for a control circuit for the arrangement shown in FIG. 1;

Figure 2:
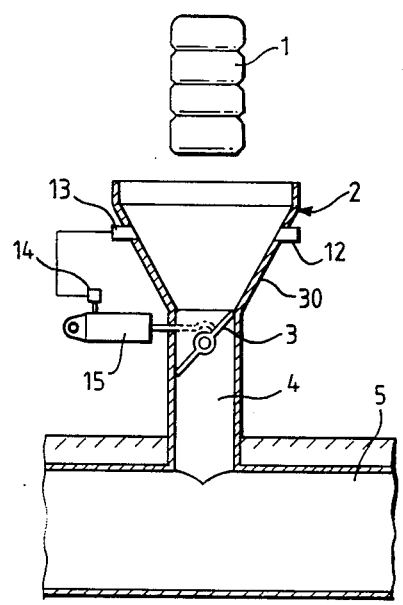
FIG. 2 is a sectional view to a larger scale through a single dust collecting head used in a modification of the arrangement shown in FIG. 1.

At each spinning station in a ring spinning machine there is a drafting head, usually comprising a set of drafting rollers and/or aprons, and in the conventional arrangement, a number of drafting heads are arranged in a row. A plurality of drafting heads 1 is illustrated in FIG. 1. When a thread breaks in the vicinity of the drafting head, the trailing end of the thread in advance of the break is wound on to the yarn package (not shown), but thread continues to issue from the drafting head. A suction head 2 comprising a nozzle 32 is provided adjacent to each drafting head 1 for the purpose of catching the leading end of thread coming from the drafting head, to prevent that thread fouling the spinning devices. As the thread end is subjected to the suction action, it disintegrates, and the fibres are drawn into the suction apparatus.

The nozzle 32 leads into a branch pipe 4, which in turn leads into a main duct 5. As is apparent from FIG. 1, the duct 5 extends along the length of the spinning machine and all the branch pipes 4, one associated with each spinning station, lead into it. At one end of the spinning machine (in this instance the opposite end to the gear end) the duct 5 leads into a fan box 6 within which is mounted a suction fan 8 driven by an AC motor 9. A filter screen 7 having replaceable filter elements is fitted in the fan box 6 on the upstram side of the fan 8.

For some applications of the invention, as illustrated in FIG. 2, each suction head may comprise an inlet funnel 30, the open top end of which is so located that it is adapted to collect any loose end of thread or yarn extending from the drafting rollers 1 or other thread processing apparatus.

A normally closed damper 3 operated by an hydraulic or pneumatic ram-and-cylinder device 15, is provided in each branch pipe 4. If a thread breaks, the thread falling from the drafting rollers 1 is collected in the funnel 30 and begins to build up in the funnel, resting on the closed damper 3.

At one side of the funnel 30, there is a light source 12 and at the other side there is a photoelectric detector 13. The photoelectric detector is set, so that if the light beam from the source 12 is interrupted by the build-up of thread or fibres in the funnel 30, it issues a signal to an electromagnetic valve 14 which in turn operates the ram-and-cylinder device 15 to open the damper 3. It will be appreciated that the height of the light source and the photoelectric detector above the damper 3 determines the volume of fibrous material which will be collected in the funnel before the damper 3 begins to open.

For controlling the speed of the driving motor 9, there is an electrical control circuit 10, which will be described in detail, and a pressure sensing pipe connected into the otherwise closed gear end of the duct 5 (i.e. the end remote from the fan box 6) this sensing pipe leading to a pressure sensor device 20 (FIG. 4) which forms part of the control circuit 10.

The control circuit 10 includes a pressure sensor 20 which detects the suction pressure in the gear end of the duct through the sensor pipe 11, and which is adapted to issue an electrical output signal proportional to the detected pressure; an amplifier 21 to amplify the output signal from the pressure sensor 20; a display unit 22 to display this output as an Alpha-numeric representation of the suction pressure in the duct; a comparative operation unit 23 to compare the output from the amplifier 21 with a reference voltage; a pressure setting element 24 for generating a reference voltage corresponding to a predetermined reference pressure (for keeping at a constant value the suction pressure in the duct) and for feeding the reference voltage into the comparative operation unit 23; a speed control unit 25 for controlling steplessly the speed of the driving motor 9 in relation to the output signal from the comparative operation unit, after comparison of the signal from the sensor 20 with the reference voltage, and an alarm circuit 26 for lighting an alarm lamp 28 when the output signal from the comparative operation unit 23 exceeds the preset value of a variable resistor 27 for setting the load factor of the driving motor 9.

Figure 4:
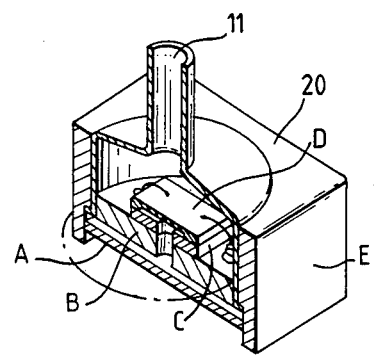
FIG. 4 is a detailed cut-away view of a pressure sensor.

The pressure sensor 20 is, in this embodiment, a diffusion type semi-conductor pressure sensor as shown in FIG. 4. This pressure sensor is of a known kind incorporating integrated circuit technology. The sensor 20 has a semi-conductor sensing chip D secured to a silicon base C on a laminating header B inside a housing E. One end of the sensing pipe 11 leads into the housing E and the bottom of the housing is closed by a temperature compensation resistance substrate A. The pressure inside the housing E will vary with the detected pressure at the gear end of the duct 5. The sensing chip D is used as a strain gauge and a constant current bridge is set up including this strain gauge. The output from the bridge circuit is a voltage proportional to the strain applied to the chip D which in turn is proportional to the applied pressure.

In a specific embodiment, the operating specification of the pressure sensor 20 is as follows:

Suction pressure setting range: 0 to $-500$ mm $H_2O$ (at 25° C.).

Precision of pressure display: within $\pm 2\%$ of set pressure (at 25° C.).

The speed control unit 25 is a rotating speed control means operating on a pulse width modulation (PWM) system, and when an AC motor is used as the driving motor 9 for driving the suction fan 8, supply and interruption of the driving current to the motor are repeated at super high speed by using a transistor chopper for varying the motor speed steplessly, and the time interval is controlled by the output signal from the operation unit 23 to adjust the mean current and voltage, while the speed of the AC motor is freely changed by varying its frequency as desired.

The other components of the control circuit 10 are all known parts, which do not require specific description.

The fibrous material collected by the nozzles is carried by an air flow of a high speed, and is immediately deposited on the suction filter 7. When this deposited amount of material increases, the air resistance (impedance) of the suction filter 7 increases. As a result, the effective suction pressure in the upstream duct of the suction filter 7 is lowered, and the fibrous material cannot be sucked effectively.

Accordingly, in order to detect such changes in the effective suction pressure and to alter the speed of the suction fan immediately so as to maintain a constant effective suction pressure, the pressure detecting precision of the pressure sensor 20 must be extremely high. In this embodiment, as mentioned above, this problem is solved by using a high precision sensor with the pressure accuracy of within $\pm 2\%$ of the said pressure (at 25° C.).

The action of the control circuit 10 is described below.

The pressure signal detected by the pressure sensor 20 is amplified by the amplifier 21, and this pressure is indicated in the display unit 22 and simultaneously is sent into the comparative operation unit 23. In the comparative operation unit 23, this amplified pressure signal is compared with the reference voltage corresponding to the specified suction pressure in the duct, generated by the pressure setting unit 24, and the difference is sent as a voltage signal into the speed control unit 25 and the alarm circuit 26.

The speed control unit 25, receiving this output signal as a command signal, controls the rotating speed of the fan by freely and continuously varying the frequency of the power source circuit applied to the driving motor 9. The alarm circuit 26, compares the output signal from the comparative operation unit with the signal set by the variable resistor 27, for setting the load factor of the motor, in order to prevent the driving motor 9 from reaching a speed too high to provide an energy saving effect, and lights up the alarm display 28 when the output signal corresponds to a speed over the load factor determined by the variable resistor 27.

The action of the apparatus illustrated in FIG. 2 is as follows:

In the operation of the machine any loose fibres or thread are collected in the funnels of the suction heads 2. When the heads are empty on start-up, all the dampers 3 are closed as shown in FIG. 2. If a damper 3 is closed, the suction fan 8 for waste yarn or fibrous material, is operated at a speed, for example, to suck the air corresponding to the air flow which would occur through two suction heads 2 if their respective dampers were opened, and this air flows through the gaps in the fully closed dampers to create a minimum suction at each suction head. When a predetermined quantity of waste fibrous material is collected in the funnel 30, the light from the light source 12 is cut off, and the signal from the photoelectric tube 13 into the electromagnetic valve 14 varies so as to cause the electromagnetic valve to operate to move the piston of the cylinder 15 in the direction to open the damper 3. When the damper 3 is opened, the waste fibrous material is sucked into the duct 5, and is drawn into the duct box 6 at high speed to be separated from the airstream. Eventually, the level of material in the funnel 30 falls to a level at which it no longer interrupts the light beam, and the cylinder 15 is then operated to re-close the damper 3.

As the level of material in each suction head 2 reaches the predetermined level the operation is effected sequentially. When the waste material removed by the filter 7 is collected in a large quantity in the fan box 6, after the lapse of a specified time, it is manually removed from the filter element and taken out of the box, and discharged through a take-out hatch 6a. By repeating these actions, operation of the machine can be continued uninterrupted.

During the process described above, the suction pressure in the duct 5 is controlled as follows: When all the dampers are closed, the part of the duct 5 which is remotest from the fan box is sucked at a constant suction pressure ($-80$ mm $H_2O$, for example). Then, when only one of the dampers is opened, the running state of the suction fan changes instantaneously and the suction pressure rises (for example up to $-70$ mm $H_2O$). In consequence, this pressure change is detected by the pressure sensor 20, and the speed of the driving motor 9 of the fan is continuously altered by the control circuit 10 so as to revert to the original set suction pressure within the duct. The running state of the suction fan at this time can be explained by referring to FIG. 5. Supposing the suction fan is rotating at N1 rpm, the relationship between the air flow Q ($m^3$/min) and suction pressure P at this time is expressed in terms of the air flow Q1 and the suction pressure of P1. When the damper 3 is opened, the impedance to air flow due to the damper increases, and the suction pressure rises. Therefore, when the fan is operated at the same speed N1, the suction pressure P1 rises to P2, and the air flow increases from Q1 to Q2. However, in practice, as mentioned above, since this suction pressure change is detected by the pressure sensor 20 and the speed of the suction fan 8 is raised to N2 by the action of the control circuit 10, in order to prevent elevation of this suction pressure, the suction pressure is controlled so that it is kept at P'2, being nearly equal to the initial pressure P1 while maintaining the air flow Q2.

The reason for keeping the suction pressure constant in the duct is as follows: when the fibrous material is standing in the funnel 30 or duct branch 4 or in the main duct 5, due to the specific gravity of friction of the fibrous material being sucked in, the material cannot be moved from the standing position if sucked at the specified pressure or slightly lower pressure. Therefore, in order to avoid such a state, it is necessary to keep the effective suction pressure in the main duct always above a certain level in order to ensure that the fibrous material will always flow adequately to reach the suction filter 7 in the fan box.

On the other hand, if the effective suction pressure is set higher, the load applied to the suction fan increases, and the power consumption of the driving motor increases. That is, if the effective suction pressure is too high, it is not favourable from the viewpoint of saving energy.

Figure 5:
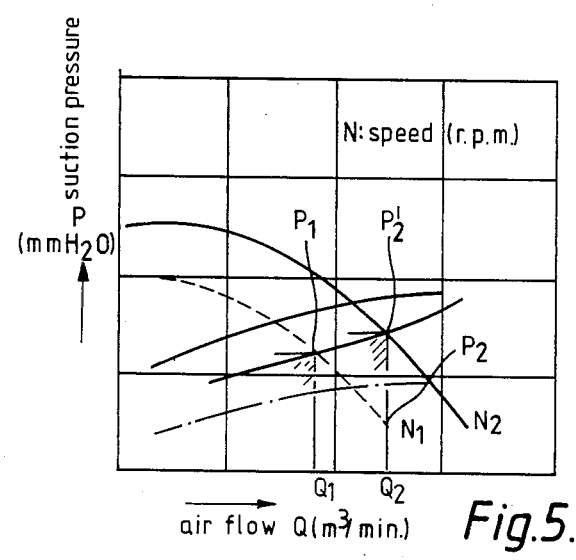
FIG. 5 is a graph showing air suction pressure plotted against air flow.
Figure 6:
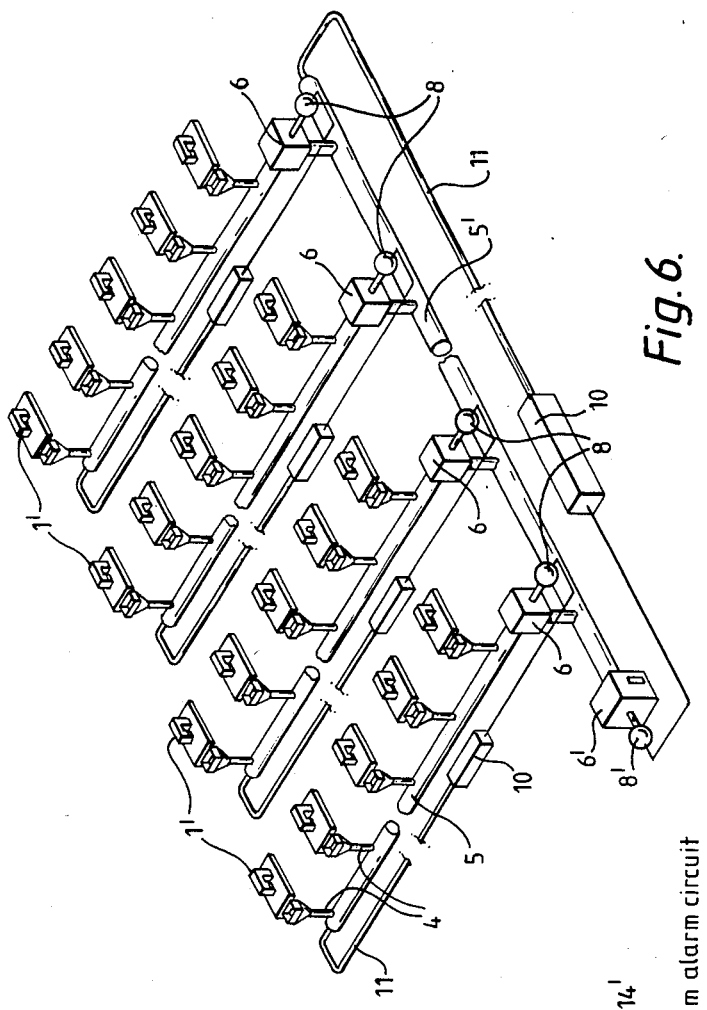
FIG. 6 is a diagrammatic perspective view of a plural duct waste yarn collecting apparatus.
Figure 7:
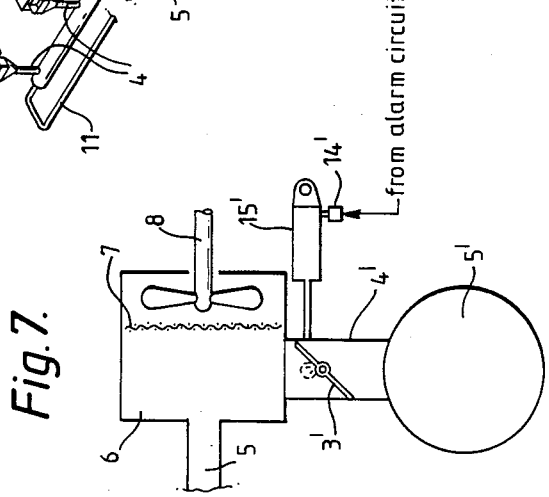
FIG. 7 is a detailed diagrammatic view of the fan end of a main duct for the apparatus of FIG. 6.

FIGS. 6 and 7 show another embodiment, wherein the pressure sensors 20 and control circuits 10 similar to those described with reference to FIGS. 1 and 5, are provided in a plural duct system (each duct 5 being associated with a row of sewing machines 1') and these plural duct systems are connected to one master duct, and another pressure sensor 20 and control circuit 10 are provided for this master duct.

The arrangement of the waste thread collecting apparatus for each duct system comprising a main duct 5 is almost identical with that of the first embodiment in the form illustrated in FIG. 2, excepting that each fan box opens on the underside upstream of the filter 7 into a connecting duct 4' leading into a transverse master duct 5'. Each connecting duct 4' is provided with a damper 3', a cylinder 15' for opening and closing the damper 3' and an electromagnetic valve 14' which function in the same manner as the damper 3 with its associated cylinder 15 and electromagnetic valve 14.

In the control circuit of this second embodiment, the alarm display signal from the comparative operation unit is simultaneously used as the signal to stop the driving motor (not shown) for a specified time and is also applied to the electromagnetic valve 14' as the switching signal of the damper 3'.

The accessories to the master duct 5' are arranged in exactly the same manner as those described with reference to the main duct 5 of the first embodiment.

The action of the second embodiment is explained below by referring only to the points of difference from that of the first embodiment.

When a large mass of waste thread is collected in the duct box 6 in one of the main ducts 5, the rotating speed of the dust collecting fan 8 increases, and when the output signal from the comparative operation unit exceeds the preset value for the load factor of the driving motor 9, a command signal to light up the alarm display unit 28 is delivered. This command signal is simultaneously given to the electromagnetic valve 14' so as to open the damper 3'. At the same time, the appropriate driving motor of the main duct system 5 is stopped for a specified time, and the material collected in duct box 6 is sucked into the master duct 5' in this period, and is carried at high speed to the dust collecting filter 7' in the duct box 6' of the master duct line. Thereafter, the action of the master duct line is the same as that of the main duct line in the first embodiment.

The first embodiment has been described with reference to fibre collecting devices applied to ring spinning machines. It is to be understood however that the method and apparatus of the invention can be used in a variety of situations. For instance, it can be used to remove dust from various points in a textile blow room, or from positions where fibres or dust are released on carding machines, or from combers, speed frames or indeed any other textile processing equipment. Another application of the method and apparatus is in a sewing room where the suction heads 2 are located under the individual sewing machines to collect threads or fibrous material falling from the sewing machines. In this application, the arrangement may be substantially as illustrated in FIG. 6, with the sewing machine sewing heads 1' substituted for the drafting heads 1.

As described above, the method and apparatus for controlling the suction pressure of a dust collecting duct by this invention can bring about a great energy saving effect by keeping the power consumption of the driving motor to a minimum while maintaining an effective suction action, by detecting the suction pressure in the duct by the sensor and varying the rotating speed of the driving motor in response to this detection signal through a control circuit so as to maintain the suction pressure in the duct as near constant as possible.

I claim:

1. Apparatus for controlling the operation of a pneumatic dust, fibre or yarn collecting system of the kind comprising: a plurality of suction heads; a main duct; each of said plurality of suction heads leading into said main duct; a motor driven suction device arranged to suck air through said suction heads and through said main duct, and a filter located in the path of the airstream passing through said suction heads and said main duct, so that solid material entrained in said airstream is collected on said filter, wherein there are provided: a sensor for detecting a physical characteristic of the air in the duct; a comparator for comparing an output signal proportional to the detected physical characteristic with a reference signal proportional to the physical characteristic which would exist in the duct given the desired suction pressure in the duct and control means responsive to an output signal from said comparator for varying the speed of said driving motor.

2. Apparatus for controlling the operation of a pneumatic dust, fibre or yarn collecting system according to claim 1, wherein a pressure setting means is provided for generating a reference voltage proportional to the desired suction pressure in said main duct.

3. Apparatus for controlling the operation of a pneumatic dust, fibre or yarn collecting system according to claim 1, wherein said control means is a pulse width modulation type revolution controller.

4. Apparatus for controlling the operation of a pneumatic dust, fibre or yarn collecting system according to claim 1, wherein each suction head comprises: a collecting device; a damper controlling an outlet from said collecting device; means for detecting the presence of a threshold quantity of material in said collecting device and control means for opening said damper to release material from said collecting device into said main duct on the attainment of said threshold quantity.

5. Apparatus for controlling the operation of a pneumatic dust, fibre or yarn collecting system according to claim 4, wherein the means for detecting the presence of said threshold quantity of material comprise a light source and a photoelectric detector arranged so that a beam of light from said light source on to said photoelectric detector is interrupted by the material in said collecting device when that material attains the threshold quantity.

6. Apparatus for controlling the operation of a pneumatic dust, fibre or yarn collecting system according to claim 1, wherein means are provided for stopping said driving motor on detection of a physical characteristic of the air in said main duct corresponding to a predetermined overload condition.

7. Apparatus for controlling the operation of a pneumatic dust, fiber or yarn collecting system according to claim 1, wherein said sensor is adapted to detect the air pressure in said main duct.

8. Apparatus for controlling the operation of a pneumatic dust, fibre or yarn collecting system according to claim 7, wherein said sensor is a diffusion type semi-conductor pressure sensor.

* * * * *